United States Patent
Luong et al.

(10) Patent No.: US 10,698,782 B2
(45) Date of Patent: Jun. 30, 2020

(54) LINK DOWNGRADE DETECTION SYSTEM

(71) Applicant: Dell Products L.P., Round Rock, TX (US)

(72) Inventors: Anh Dinh Luong, Austin, TX (US); Thomas Kelley Chenault, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 234 days.

(21) Appl. No.: 15/968,100

(22) Filed: May 1, 2018

(65) Prior Publication Data

US 2019/0340092 A1    Nov. 7, 2019

(51) Int. Cl.
*G06F 11/00* (2006.01)
*G06F 11/26* (2006.01)
*G06F 11/22* (2006.01)
*G06F 9/4401* (2018.01)
*G06F 13/40* (2006.01)

(52) U.S. Cl.
CPC ............ *G06F 11/26* (2013.01); *G06F 9/4401* (2013.01); *G06F 11/221* (2013.01); *G06F 11/2284* (2013.01); *G06F 13/4068* (2013.01)

(58) Field of Classification Search
CPC ..... G06F 11/26; G06F 11/221; G06F 11/2284
See application file for complete search history.

(56) References Cited

U.S. PATENT DOCUMENTS

| 6,603,741 | B1 * | 8/2003 | Poulter | H04L 1/0002 370/252 |
| 2004/0062262 | A1 * | 4/2004 | Venteicher | H04L 47/14 370/431 |

* cited by examiner

*Primary Examiner* — Katherine Lin
(74) *Attorney, Agent, or Firm* — Haynes and Boone, LLP

(57) ABSTRACT

A link downgrade detection system includes an interface that is coupled to an endpoint device. The endpoint device is configured to provide an endpoint link that includes a first link capability at a maximum first link capability level and a second link capability at a maximum second link capability level. The endpoint device stores a working first link capability level and a working second link capability level in a first memory device included on the endpoint device. A BIOS coupled to the chassis interface enumerates the endpoint device, determines an actual first link capability level and an actual second link capability level, and retrieves the working link capability levels. The BIOS then determines, based on the working link capability levels and the actual link capability levels that the endpoint link is downgraded, and in response provides a notification that the endpoint link of the endpoint device is downgraded.

20 Claims, 6 Drawing Sheets

LINK DOWNGRADE DETECTION SYSTEM

BACKGROUND

The present disclosure relates generally to information handling systems, and more particularly to detecting link downgrades in endpoint devices used in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include peripheral devices that may be connected to the information handling system via a motherboard. For example, network cards, video cards, port expansion cards, storage devices, and other peripheral devices may be coupled to the motherboard using high-speed serial links in order to enhance the capabilities and performance of the information handling system. Peripheral Component Interconnect Express (PCIe) is a standard for such high speed serial links between the motherboard and the peripheral device, and provides for communication between PCIe devices via a logical connection called a link, which is a point-to-point communication channel between two PCIe ports that allows for the sending and receiving of ordinary PCIe requests and interrupts. At the physical level, a link is composed of one or more lanes, and a lane is composed of two differential signaling pairs, with one pair utilized for receiving data and the other pair utilized for transmitting data. Thus, each lane is composed of four wires or signal traces. Conceptually, each lane is used as a full-duplex byte stream, transporting data packets in eight-bit "byte" format simultaneously in both directions between endpoints on a link. Physical PCIe links typically contain from one to 32 lanes and, more precisely, 1 lane, 2 lanes, 4 lanes, 8 lanes, 12 lanes, 16 lanes, or 32 lanes, and PCIe links typically operate at transfer rates of 2.5 GT/s, 5.0 GT/s, 8.0 GT/s, 16.0 GT/s, or 32 GT/s.

During a power-on self-test (POST) operation performed by a Basic Input/Output System (BIOS), the BIOS may access a link capabilities register that is included on a PCIe device and that advertises the Maximum Link Speed (MLS) and a Maximum Link Width (MLW) for the PCIe device, as well as a link status register that is included on the PCIe device and that advertises a Current Link Speed (CLS) and a Negotiated Link Width (NLW) for the PCIe device. In a conventional BIOS, if one of the CLS is less than the MLS, and/or the NLW is less than the MLW, then the BIOS reports a downgrade of the PCIe link to a user, which may indicate to the user that the PCIe device is not functioning properly. However, some PCIe devices may intentionally reduce link width or link speed as a power saving measure when it is not necessary to have both a maximum link speed and a maximum link width to achieve a desired level of performance (e.g., an optimal level of performance.) As such, the conventional BIOS may report that the PCIe link is downgraded even though the PCIe device is in a reduced power state that still maintains the desired level of performance for the PCIe device. Thus, users may receive the downgrade notification for that PCIe device operating at the desired level of performance while in the reduced power state mode, and begin troubleshooting procedures when there is no need to do so. In other instances, repeated downgrade notifications resulting from the above issues may cause a user to ignore a downgrade notification that is a result of reduced performance of the PCIe device and/or the device to which the PCIe device is attached.

Accordingly, it would be desirable to provide an improved link downgrade detection system.

SUMMARY

According to one embodiment, an Information Handling System (IHS), includes: an interface; a processing subsystem coupled to the interface; and a memory subsystem that is coupled to the processing subsystem and that includes instructions that, when executed by the processing subsystem, causes the processing subsystem to provide a Basic Input/Output System (BIOS) that is configured to: enumerate an endpoint device that includes an endpoint interface that is coupled to the interface, wherein the endpoint device is configured to provide an endpoint link that includes a first link capability at a maximum first link capability level and a second link capability at a maximum second link capability level, and wherein the endpoint device is configured to store a working first link capability level and a working second link capability level in a first memory device included on the endpoint device; determine an actual first link capability level of the first link capability of the endpoint device; determine an actual second link capability level of the second link capability of the endpoint device; retrieve the working first link capability level and the working second link capability level from the first memory device; determine, based on the working first link capability level, the working second link capability level, the actual first link capability level, and the actual second link capability level, that the endpoint link is downgraded; and provide in response to determining that the endpoint link is downgraded, a notification that the endpoint link of the endpoint device is downgraded.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
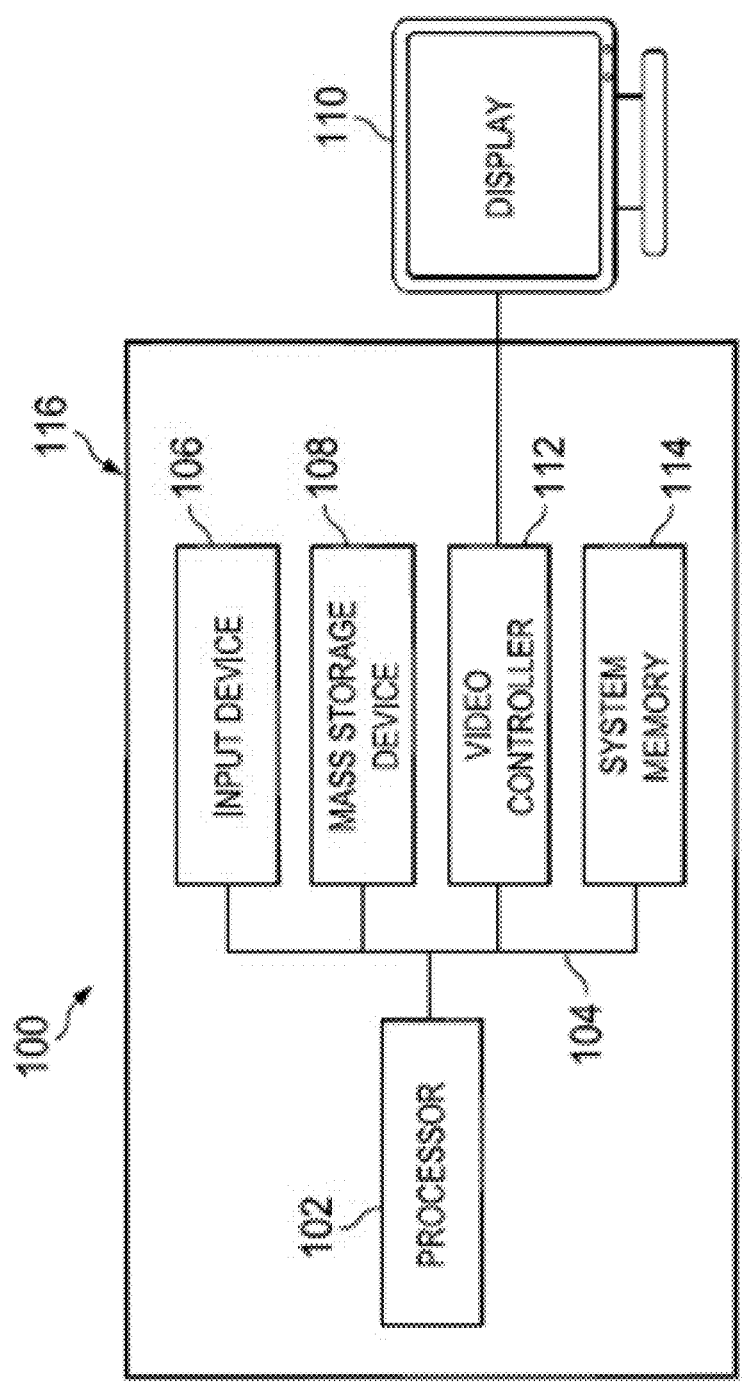
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
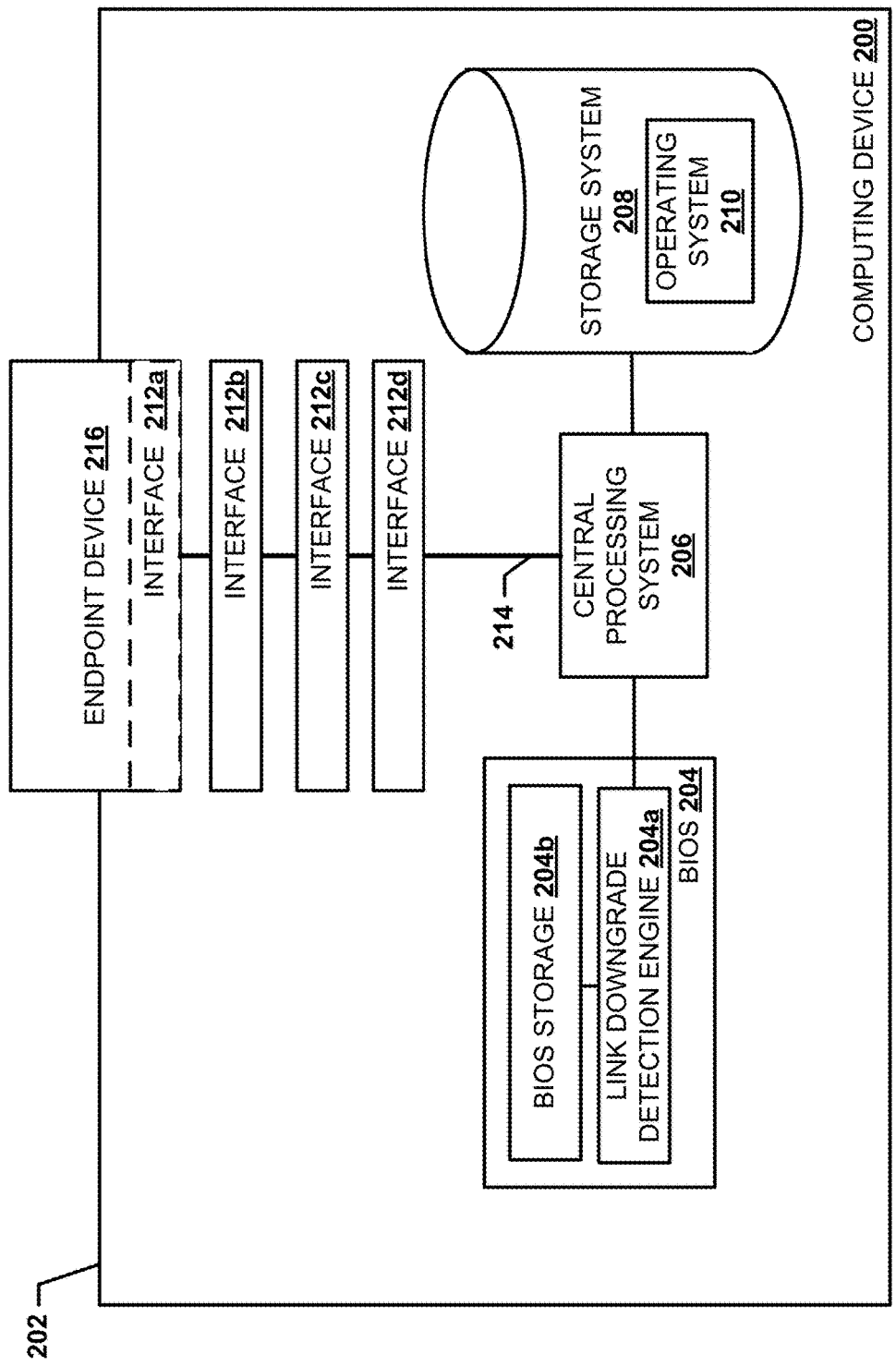
FIG. 2 is a schematic view illustrating an embodiment of a computing device that includes a link downgrade detection system.

Referring now to FIG. 2, an embodiment of a computing device 200 is illustrated that may be provided by the IHS 100 discussed above with reference to FIG. 1, and/or may include some or all of the components of the IHS 100. In specific embodiments, the computing device 200 may be a server device, a desktop computing device, a laptop/notebook computing device, a tablet computing device, a mobile phone, and/or a variety of other computing devices that would be apparent to one of skill in the art in possession of the present disclosure. In the illustrated embodiment, the computing device 200 includes a chassis 202 that houses the components of the computing device 200, only some of which are illustrated in FIG. 2. For example, the chassis 202 may house a Basic Input/Output System (BIOS) processing subsystem (not illustrated, but which may include the processor 102 discussed above with reference to FIG. 1) and a BIOS memory subsystem (not illustrated, but which may include the memory 114 discussed above with reference to FIG. 1) that includes instructions that, when executed by the BIOS processing subsystem, cause the BIOS processing subsystem to provide a BIOS 204 that is configured to perform the functions of the BIOS and/or computing devices discussed below.

As would be appreciated by one of skill in the art in possession of the present disclosure, the BIOS 204 may be provided by non-volatile firmware (e.g., provided by the combination of the BIOS processing subsystem and BIOS memory subsystem discussed above) that is configured to perform hardware initialization during a booting process of the computing device 200, as well as provide runtime services for operating systems and/or other programs/applications executed on the computing device 200. While referred to as a "BIOS", one of skill in the art in possession of the present disclosure will recognize that the BIOS 204 may be provided according to the Unified Extensible Firmware Interface (UEFI) specification and, as such, may include or be coupled to a software interface between an operating system provided by the computing device 200 and platform firmware included in the computing device 200. Thus, the BIOS 204 may be provided by UEFI firmware that may also provide UEFI functionality, legacy support for BIOS services, and/or other functionality while remaining within the scope of the present disclosure as well.

In the illustrated embodiment, the BIOS 204 includes a link downgrade detection engine 204a that may be provided, for example, by the BIOS processing subsystem discussed above via the execution of instructions included on the BIOS memory subsystem discussed above. One of skill in the art in possession of the present disclosure will recognize that the link downgrade detection engine 204a is illustrated and described herein as providing link downgrade detection functionality of the present disclosure, and that the BIOS 204 may perform a variety of other BIOS functionality while remaining within the scope of the present disclosure as well. The BIOS 204 also includes a BIOS storage 204b that is coupled to the link downgrade detection engine 204a (e.g., via a coupling between the BIOS storage 204b and the BIOS processing subsystem), and that may store any of the information utilized as discussed below (e.g., the link downgrade rules, link downgrade notifications, and/or any other BIOS information that would be apparent to one of skill in the art in possession of the present disclosure.) For example, the BIOS storage 204b may be provided by a BIOS Serial Peripheral Interface (SPI) flash storage device, although other storage subsystems will fall within the scope of the present disclosure as well.

The chassis 202 may also house a central processing system 206 (e.g., a Central Processing Unit (CPU)) that is coupled to the link downgrade detection engine 204a in the BIOS 204 (e.g., via a coupling between the BIOS processing subsystem and the central processing system 206.) In various embodiments, the central processing system 206 may load BIOS instructions that provide the BIOS 204, execute the BIOS instructions to provide the BIOS 204 on one or more of cores of the central processing system 206, and/or perform other central processing system functionality that would be apparent to one of skill in the art in possession of the present disclosure. The chassis 202 may also house a storage system 208 that is coupled to the central processing system 206 and/or the BIOS 204. The storage system 208 may include any of a variety of storage devices and/or other components that allow for the storage of an operating system (OS) 210 that may be loaded during the boot process by the BIOS 204 and the central processing system 206, as well as the other data discussed below.

The chassis 202 may also house one or more interfaces such as an interface 212a, an interface 212b, an interface 212c, and up to an interface 212d. Each of the interfaces may be coupled to the BIOS 204 and/or the central processing system 206 by one or more communication buses such as, for example, a communication bus 214. In an embodiment, the one or more interfaces 212a, 212b, 212c, and 212d may be board/card slots that are configured to receive edge connectors of an endpoint device 216, ports that are configured to receive cable connectors to an endpoint device, and/or other interfaces that are configured to couple with an endpoint device and that would be apparent to one of skill in the art in possession of the present disclosure. For example, the one or more interfaces 212a, 212b, 212c, and 212d may include Peripheral Component Interconnect (PCI) slots, a PCI express (PCIe) slots, and/or a variety of other interfaces that would be apparent to one of skill in the art and that may benefit from the teachings of the present disclosure. While four interfaces 212a-212d are illustrated in the chassis 202, one of skill in the art in possession of the present disclosure will recognize that any number of interfaces may be provided while remaining within the scope of the present disclosure.

In the illustrated embodiment, the chassis 202 houses the endpoint device 216 that is coupled to the interface 212a. In various embodiments, the endpoint device 216 may include a computer-on-module that may be provided by the IHS 100 discussed above with reference to FIG. 1, and/or that may include some or all of the components of the IHS 100. However, in other embodiments, the endpoint device 216 may be provided by a network card, a video card, a port expansion card, a storage device, and/or any other endpoint device 216 that would be apparent to one of skill in the art in possession of the present disclosure. While the endpoint device 216 is illustrated as being housed in the chassis 202, the endpoint device 216 may be coupled to the BIOS 204 and/or the central processing system 206 via a connection that is external to the chassis 202 while still remaining within the scope of the present disclosure. While a specific computing device 200 has been illustrated and described, one of skill in the art in possession of the present disclosure will recognize that computing devices may include a variety of different components and/or component configurations that enable the performance of conventional computing device functionality, as well as the functionality discussed below, while remaining within the scope of the present disclosure.

Figure 3:
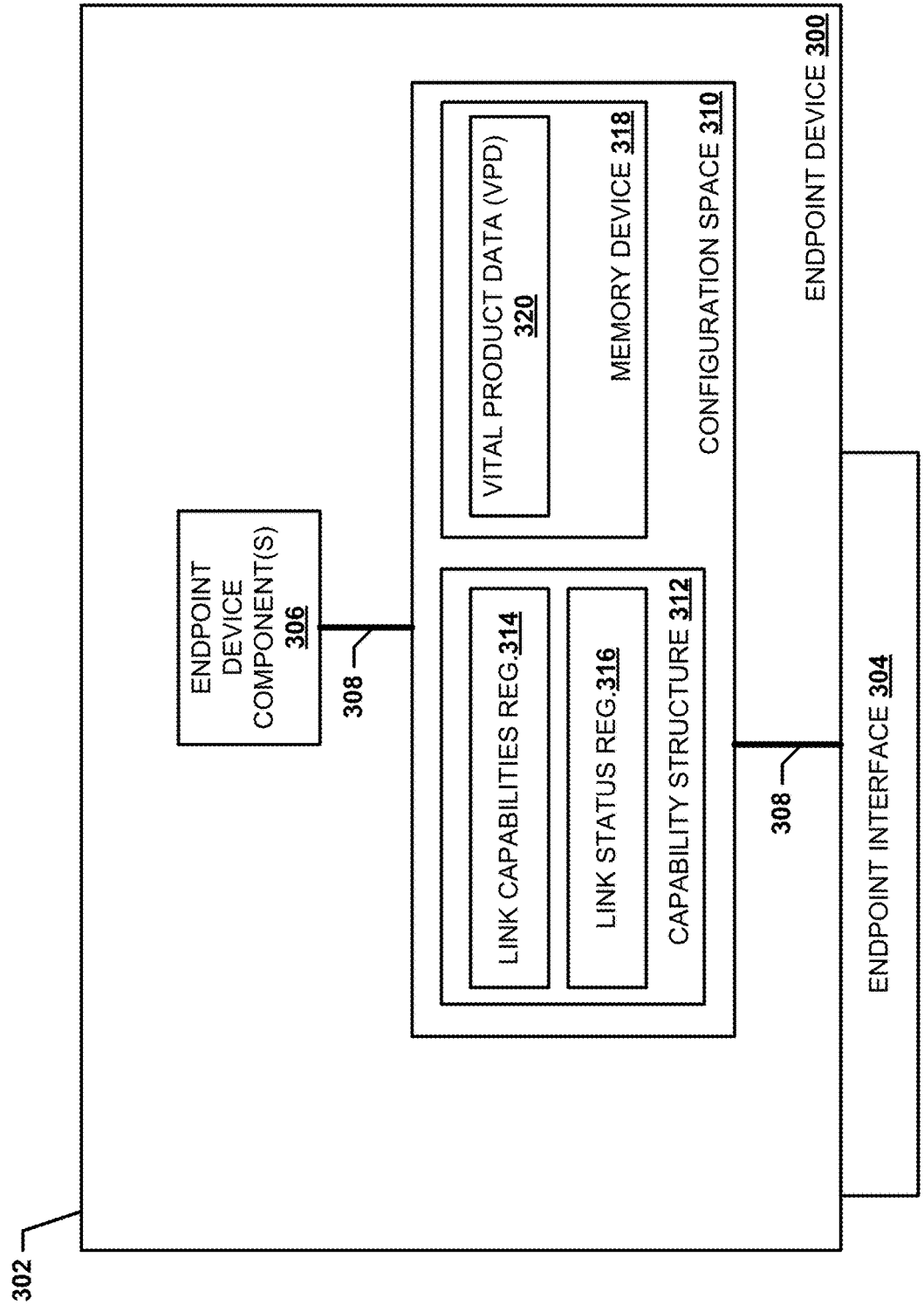
FIG. 3 is a schematic view illustrating an embodiment of an endpoint device that may be provided in the computing device of FIG. 2.

Referring now to FIG. 3, an embodiment of an endpoint device 300 is illustrated that may be the endpoint device 216 discussed above with reference to FIG. 2. As such, the endpoint device 300 may be provided by the IHS 100 discussed above with reference to FIG. 1, and/or may include some or all of the components of the IHS 100. In an embodiment, the endpoint device 300 may include a chassis 302 such as, for example, a printed circuit board or other endpoint device chassis known in the art. In the illustrated embodiment, the endpoint device 300 includes an endpoint interface 304 that is configured to couple with one or more of the interfaces 212a-212d of FIG. 2. In a specific example, the endpoint interface 304 may include a PCI connector, a PCIe connector, and/or any other interface that would be apparent to one of skill in the art in possession of the present disclosure.

One or more endpoint device components 306 may be located on or housed in the chassis 302, and may be coupled to the endpoint interface 304 via a bus 308. For example, the endpoint device component(s) 306 may include a variety of electrical and/or mechanical components that may be provided in and/or on the chassis 302 such as one or more interfaces (e.g., a memory card slot, a PCI card slot), various types of controllers, power connectors, processor connectors, heat sinks, memory systems, and/or other endpoint device components 306 that would be apparent to one of skill in the art in possession of the present disclosure. One of skill in the art will recognize that the endpoint device components 306 may vary due to the type of functionality the endpoint device 300 is configured to perform. For example, a graphics card may include a graphics processor, while a network card may include a network interface controller (NIC).

The chassis 302 may house or be coupled to a configuration space 310 that is coupled to the endpoint interface 304 via the bus 308, and that may be provided by one or more memory devices located on the chassis 302 and coupled to the bus 308. For example, in PCI/PCIe endpoint devices, the configuration space 310 may provide a plurality of functions that the BIOS 204 and/or other configuration software may utilize to initialize and configure the endpoint device 300. In the illustrated embodiment, the configuration space 310 includes a capability structure 312 having a plurality of registers such as a link capabilities register 314 and a link status register 316. The link capabilities register 314 may include a maximum link speed field, a maximum link width field, an active state link power management support field, an L0 exit latency field, an L1 exit latency field, a port number field, and/or any other field that would be apparent to one of skill in the art in possession of the present disclosure. The link status register 316 may include a current link speed field, a negotiated link width field, and/or a variety of other bits and fields that would be apparent to one of skill in the art in possession of the present disclosure. While specific examples of registers included in the capability structure 312 are illustrated and described, one of skill in the art in possession of the present disclosure would recognize that other registers may be included in the capability structure 312 without departing from the scope of the present disclosure.

In the illustrated embodiment, the configuration space 310 also includes a memory device 318 that may be provided by, for example, an electrically erasable programmable read only memory (EEPROM), and/or any other non-volatile memory that would be apparent to one of skill in the art in possession of the present disclosure. The memory device 318 may store a vital product data (VPD) structure 320 that may include information that uniquely identifies hardware and/or software of the endpoint device 300. For example, when the endpoint device 300 is coupled to the computing device 200, a conventional VPD may provide the computing device 200 with information on various field replaceable unit information such as a part number, a serial number, a manufacturer, and/or other information about the endpoint device 300 that would be apparent to one skill in the art in possession of the present disclosure. In various embodiments, the VPD structure 320 of the present disclosure may also include one or more working link capability levels at which the endpoint device 300 may operate, and at least one of the working link capability levels may be less than its corresponding maximum link capability level (e.g., the maximum link width and/or the maximum link speed for the endpoint device 300) stored in the link capabilities register 314. Thus, the VPD structure 320 may include one or more working link speeds, working link widths, and/or combinations of working link speed and working link width at which the endpoint device 300 may operate while in a power saving mode, with at least one of the working link speed(s) and/or the working link width(s) being less than its corresponding maximum link speed and/or maximum link width. While a specific endpoint device 300 has been illustrated and described, one of skill in the art in possession of the present disclosure will recognize that endpoint devices may include a variety of different components and/or component configurations that enable the performance of conventional endpoint device functionality, as well as the functionality discussed below, while remaining within the scope of the present disclosure.

Figure 4:
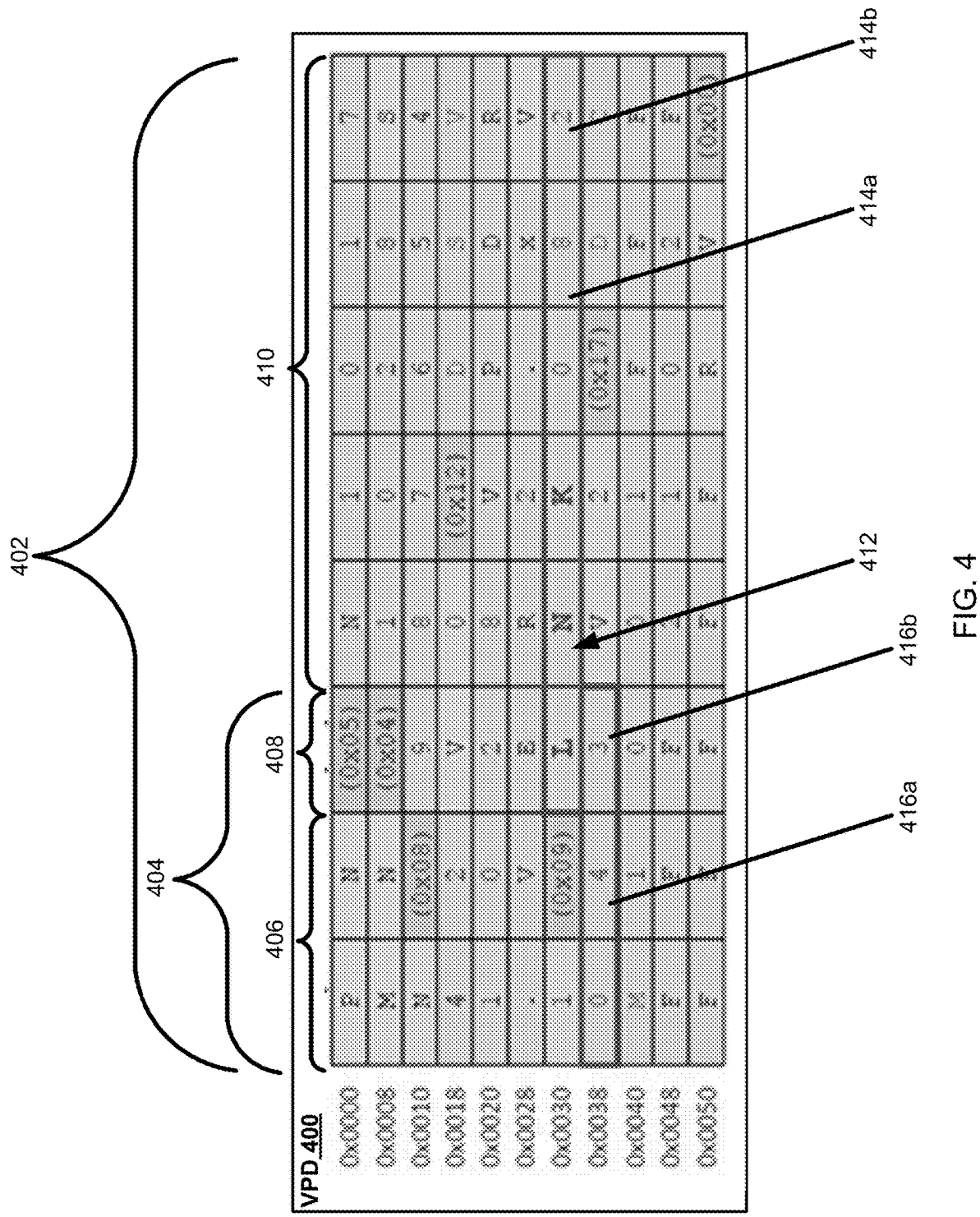
FIG. 4 is a schematic view illustrating an embodiment of an endpoint device storage that may be provided in the endpoint device of FIG. 3.

Referring now to FIG. 4, an embodiment of a VPD structure 400 is illustrated that may be the VPD structure 320 of FIG. 3. As illustrated, the VPD structure 400 may provide a plurality of information fields that each include a header that includes a keyword and a length, with that header followed by one or more data fields having associated information. For example, for row 0x0000 of the VPD 400 (e.g., the top row in FIG. 4), an information field 402 (PN(0x05)N1017) includes a header 404 that includes a two-element keyword 406 (P and N or "PN") and a length 408 (0x05) of information 410 (N, 1, 0, 1, and 7) in the five data fields that follow the header 404. In the illustrated example, the keyword 406 includes a two-byte keyword that is provided by a two-character American Standard Code for Information Interchange (ASCII) mnemonic that uniquely identifies its associated information 410 in the information fields 402 that follow the header 404. As such, each keyword in the VPD 400 may be immediately followed by a length that is then immediately followed by information associated with the keyword. For example, row 0x0000 of the VPD 400, provides the header 404 followed by the information 410 that is designated as the five data fields following the header 404 by the length 408. In a specific example, the information in some information fields 402 may include a subtype keyword such as, for example, vendor specific information fields "Vx."

For example, with reference to the final column in row 0x0028 of the VPD 400 and the first column of row 0x0030 of the VPD 400, a two element keyword "V1" is provided, and immediately followed by a length "0x09" (i.e., in the second column of row 0x0030 of the VPD 400), which is immediately followed by a three element subtype keyword 412 of "LNK" (i.e., in the third, fourth and fifth columns of row 0x0030 of the VPD 400). In an embodiment, the subtype keyword "LNK" may be used to identify one or more working link capabilities or combination of working link capabilities. For example, the information following the three element subtype keyword 412 "LNK" may include a combination of a first working link width value 414a (e.g., the "0" in the sixth column of row 0x0030 of the VPD 400, and the "8" in the seventh column of row 0x0030 of the VPD 400) and a first working link speed value 414b (e.g., "2" in the eighth column of row 0x0030 of the VPD 400), as well as a combination of a second working link width value 416a (e.g., the "0" in the first column of row 0x0038 of the VPD 400, and the "4" in the second column of row 0x0038 of the VPD 400) and a second working link speed value 416b (e.g., "3" in the third column of row 0x0038 of the VPD 400). As such, the first working link width value 414a and/or the second working link width value 416a may be provided by two bytes that are each an ASCII character in the range of '0'-'9', with the two characters together indicating a number of connected PCIe lanes for the endpoint device 300. Furthermore, the first working link speed value 414b and/or the second working link speed value 416b may be provided by one byte that identifies a speed generation for the endpoint device 300, which corresponds to a maximum link speed field in the link capabilities register 314 and/or a current link speed in the link status register 316. As illustrated, the first working link speed value 414b and the second working link speed value 416b in the VPD structure 400 may be encoded as an ASCII character (e.g., '2' and '3') rather than a binary value (e.g., 0011b) that it is typically encoded in in the link capabilities register 314 and the link status register 316.

In the example illustrated in FIG. 4, the information following the "LNK" subtype keyword 412 (e.g., "082043") is configured to indicate, for the endpoint device 300 that may be configured to advertise a maximum link width of 8 and a maximum link speed generation of 3 in its link capabilities register 314, that the endpoint device 300 may achieve optimal performance with either a combination of a working link width of "08" lanes and a working link speed generation of "2" (i.e., via the "082" in the information fields 402 following the "LNK" subtype keyword 412), or a combination of a working link width of "04" lanes and a working link speed generation of "3" (i.e., via the "043" in the information fields 402 following the "LNK" subtype keyword 412 and the "082" in the information fields 402). While a specific VPD structure 400 has been illustrated and described, one of skill in the art in possession of the present disclosure will recognize that VPD structures may include a variety of different configurations that enable the performance of conventional VPD structure functionality and VPD information, as well as the functionality and information discussed below, while remaining within the scope of the present disclosure.

Figure 5:
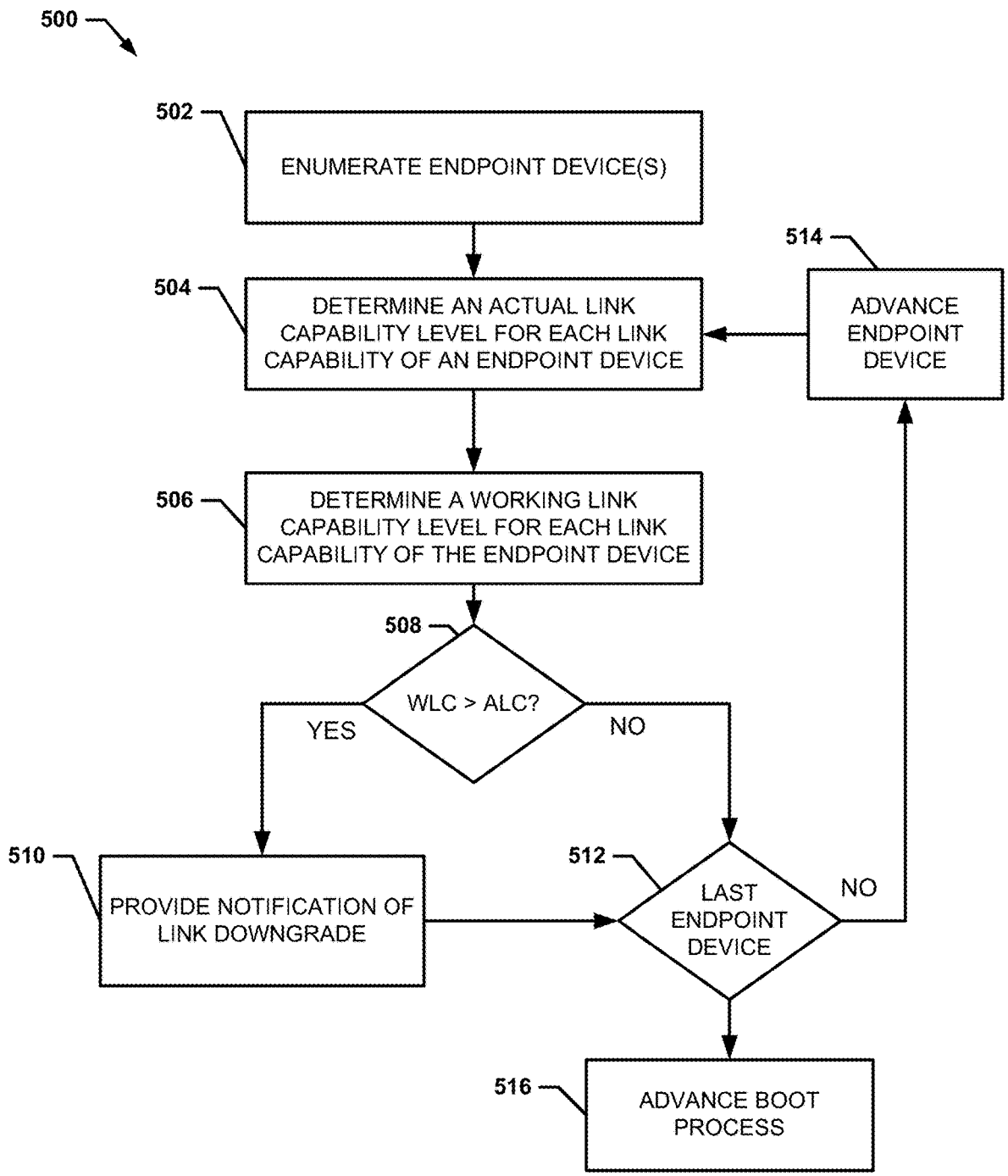
FIG. 5 is a flow chart illustrating an embodiment of a method for detecting a link downgrade.

Referring now to FIG. 5, an embodiment of a method 500 for detecting a link downgrade is illustrated. As discussed above, the systems and methods of the present disclosure provide for more accurate detection of whether the performance of a link between an endpoint device and a computing device has been downgraded. As discussed above, endpoint devices may intentionally operate a link capability at a link capability level that is less than its maximum link capability level in order to realize power consumption efficiencies, with that link capability level still providing a desired performance level for the link that is equivalent to operating the link at the maximum link capability level. When detecting whether an endpoint device is providing a downgraded link, a conventional BIOS does not have the capability to detect when endpoint devices have intentionally downgraded one or more link capabilities for power efficiencies and without degrading the performance of that link, and will report these endpoint devices as having a downgraded link, which may result in unnecessary troubleshooting by a user of the endpoint device.

The systems and methods of present disclosure may provide a BIOS that is configured to query vital product data (VPD) stored in the endpoint device to determine whether the endpoint device is capable of operating one or more link capabilities at levels that are less than the maximum link capability levels for that endpoint device, as well as whether at least one actual link capability provided by the endpoint device is less than a working link capability that the endpoint is capable of. By providing working link capabilities in the VPD, an endpoint device may advertise a working link capability level of a link capability that is less than a maximum link capability level for that link capability, but that still provides for a desired performance of the link. Thus, endpoint devices that intentionally operate at link capability levels that are less than corresponding maximum link capability levels but that still provide for desired performance of a link may not be identified as providing a downgraded link, while endpoint devices that operate at link capability levels that are less than their corresponding working link capability levels may be identified as providing a downgraded link.

The method 500 begins at block 502 where an endpoint device is enumerated. In an embodiment of block 502, the BIOS 204 may initiate a boot process of the computing device 200 and may enumerate any endpoint device 216 that may be coupled to the BIOS 204 via the interfaces 212a-212d and the communication bus 214. The enumeration process may include discovering all of the endpoint devices 216 that are coupled to the computing device 200, determining memory requirements for each endpoint device 216, configuring all of the endpoint devices 216, and/or performing any other enumeration processes that would be apparent to one of skill in the art in possession of the present disclosure.

The method 500 then proceeds to block 504 where an actual link capability level for each link capability of an endpoint device is determined. In an embodiment of block 504, the link downgrade detection engine 204a of the BIOS 204 may determine at least one actual first link capability level of a first link capability of the endpoint device 216, may determine an actual second link capability level of a second link capability of the endpoint device 216, and may determine any other actual link capability levels of link capabilities of the endpoint device 216 until all of the actual link capability levels for the endpoint device 216 have been determined. For example, the link downgrade detection engine 204a may obtain, from the link status register 316 of the endpoint device 300, a negotiated link width and/or a current link speed.

The method 500 then proceeds to block 506 where a working link capability level for each link capability of the endpoint device is determined. In an embodiment of block 506, the link downgrade detection engine 204a of the BIOS 204 may determine a working link capability level for each link capability of the endpoint device 216, a combination of two or more working link capability levels for link capabilities of the endpoint device, and/or any other working link capability level information for the endpoint device 216 that would be apparent to one of skill in the art in possession of the present disclosure. For example, the link downgrade detection engine 204a may obtain, from the VPD structure 320, a working link speed and/or a working link width. In the specific example of FIG. 4, the link downgrade detection engine 204a may identify the "LNK" subtype keyword 412 in the VPD 400, along with the corresponding first combination of the first working link width value 414a and the first working link speed value 414b (e.g., "082") that indicates that an actual link width of 8 lanes and an actual link speed of generation 2 (i.e., 5.0 GT/s) will provide for a desired performance level for the link. In addition, the link downgrade detection engine 204a may also identify the second working link width value 416a and the second working link speed value 416b (e.g., "043") corresponding to the "LNK" subtype keyword 412 that indicates that an actual link width of 4 lanes and an actual link speed of generation 3 (i.e., 8.0 GT/s) will provide for the desired performance level for the link.

The method 500 then proceeds to decision block 508 where it is determined, based on any of the actual link capabilities determined at block 504 and the working link capabilities determined at block 506, whether the link between the endpoint device and the computing device is downgraded. In an embodiment of decision block 508, the link downgrade detection engine 204a may compare the actual link capabilities determined at block 504 to the corresponding working link capabilities determined at block 506. If, at decision block 508, it is determined that a working link capability is greater than its corresponding actual link capability, then a link downgrade exists and the method 500 may proceed to block 510. If, at decision block 508, it is determined that the actual link capability is at least equal to its corresponding working link capability, then the method 500 may proceed to block 512. In various embodiments where there are one or more combinations of working link capability levels, if at decision block 508 it is determined that none of the link width/link speed combinations include working link capability levels that are all equal to or less than the corresponding actual link capability levels, then it may be determined that a link downgrade exists on that endpoint device 216 and the method 500 may proceed to block 510. However, if at decision block 508 it is determined that at least one of the link width/link speed combinations includes working link capability levels that are all equal to or less than the corresponding actual link capability levels, then a link downgrade does not exist on that endpoint device 216 and the method 500 may proceed to block 512.

Referring to the specific example in FIG. 4, if the link status register 316 indicates that the negotiated link width of the endpoint device 300 is 2 lanes and the current link speed is generation 3, the link downgrade detection engine 204a may determine that a link downgrade exists on the endpoint device 300 that includes the VPD structure 400, as the actual link width (2 lanes) is less that the working link widths (identified by the VPD structure 400 as being 8 lanes or 4 lanes. Similarly, if the link status register 316 indicates that the negotiated link width of the endpoint device 300 is 4 lanes and the current link speed is generation 2, then the link downgrade detection engine 204a may determine that a link downgrade exists on the endpoint device 300 that includes the VPD structure 400, as the negotiated link width/current link speed combination ("04" and "2") includes an actual link width ("04") that is less than the working link width ("08") required to produce the desired performance level with a link speed of "2", and an actual link speed ("2") that is less than the working link speed ("3") that is required to produce the desired performance level with a link width of "04". In other words, the actual link width/link speed combination ("04" and 2") is deficient in either the actual link width or the actual link speed needed to satisfy either of the first working link width/link speed combination ("08" and "2") or the second working link width/link speed combination ("04" and "3") provided in the VPD 400.

However, in another example, if the link status register 316 indicates that the negotiated link width of the endpoint device 300 is 8 lanes and the current link speed is generation 2, then the link detection engine 204a may determine that there is no downgraded link on the endpoint device that includes the VPD structure 400, as the negotiated link width/current link speed combination ("08" and "2")

matches the first working link width/link speed combination ("08" and "2"). As would be appreciated by one of skill in the art in possession of the present disclosure, in conventional systems in which the link capabilities register 314 was provided with a maximum link width of 8 lanes and a maximum link speed of generation 3, a negotiated link width/current link speed combination of "08" and "2" would result in a mismatch due to the actual current link speed of generation 2 being less than the maximum link speed of generation 3. As such, conventional link detection systems would produce a notification of a downgraded link in the example above, even though the endpoint device 300 is able to operate at a desired performance level (e.g., an optimal performance level) at the negotiated link width of 8 lanes and the current link speed of generation 2 (e.g., while realizing power savings.)

Figure 6:
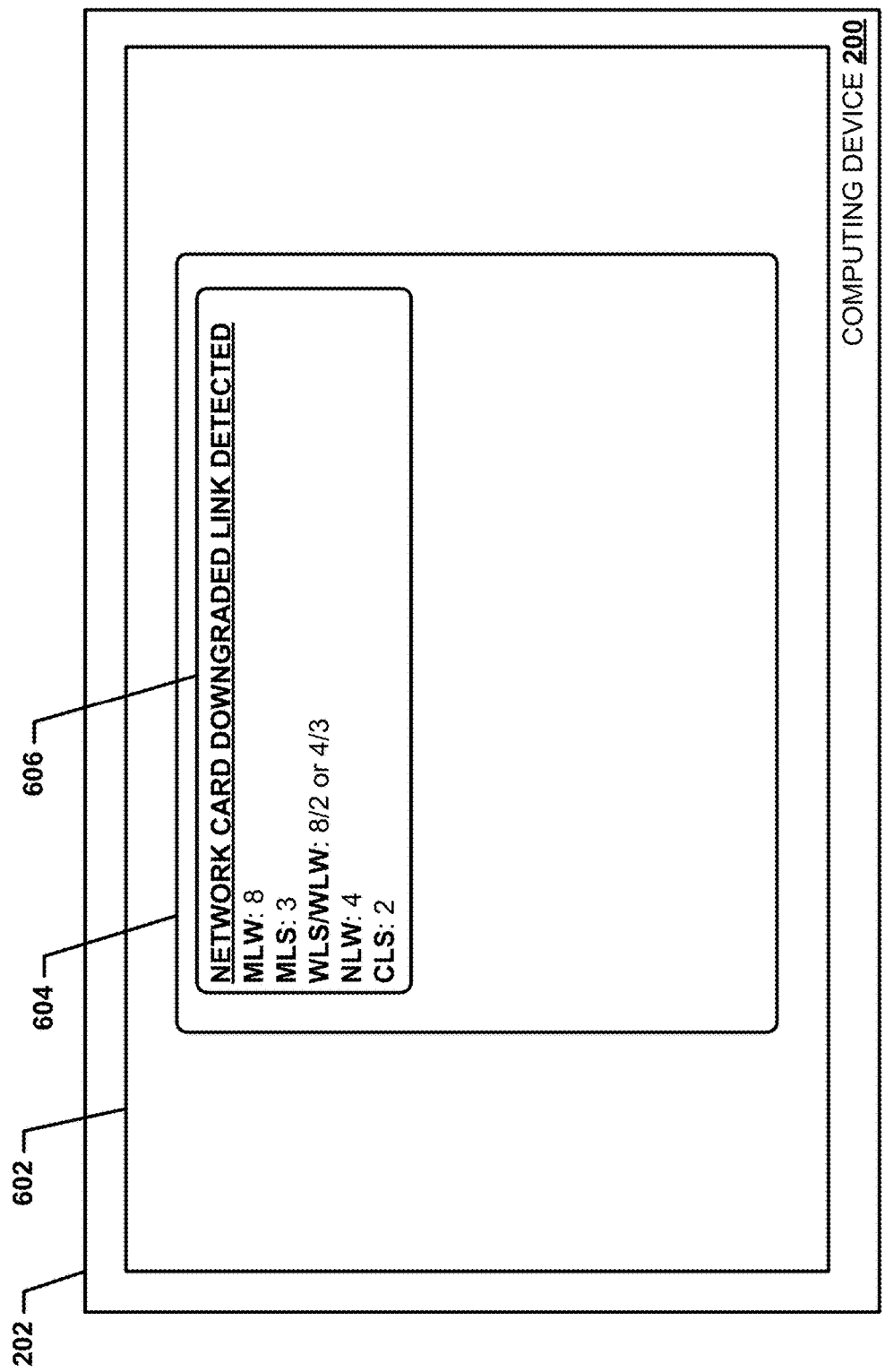
FIG. 6 is a screenshot view illustrating an embodiment of a graphical user interface provided on a display screen by the link downgrade detection system of the computing device of FIG. 2.

If, at decision block 508, it is determined that a downgraded link exists, the method 500 proceeds to block 510 where a downgraded link notification is provided that indicates that the link of the endpoint device is downgraded. In embodiment at block 510, the BIOS 204 may provide a notification of the downgraded link to a user of the computing device 200. For example, the BIOS 204 may log the downgraded link in a log file that is stored in the BIOS storage 204b and/or the storage system 208, and the user may retrieve the log file to access the notification. In other examples, if the BIOS 204 has initialized a display system included in the computing device 200, the BIOS 204 may provide the notification via a graphical user interface during the boot process and/or once the OS 210 has been loaded. For example, referring to FIG. 6, the computing device 200 is illustrated with a display screen 602. If the BIOS 204 has successfully initiated a display system included in the computing device 200, the BIOS 204 may provide the notification as a graphical user interface 604 on the display screen 602 that identifies each endpoint device that is operating with a downgraded link. The graphical user interface 604 may include a text box 606 identifying, to the user, the endpoint device that is operating with a downgraded link, as well as information about the link such as, for example, the maximum link width, the maximum link speed, the working link width(s), the working link speed(s), the negotiated link width, the current link speed, troubleshooting procedures, technical support contact information, and/or any other information that would be apparent to one of skill in the art in possession of the present disclosure as providing information that may help the user diagnose and resolve the downgraded link. While several specific examples of presenting a downgraded link notification to the user of the computing device 200 have been discussed, one of skill in the art in possession of the present disclosure would recognize that the downgraded link notification may be presented to the user in a wide variety of manners such as, for example, via a user device (e.g., a mobile phone) coupled to the computing device 200, via a visual indicator (e.g., one or more LEDs) located on the computing device 200, and/or via an audio indicator (e.g., a speaker system) located on the computing device 200.

If, at decision block 508, it is determined that the endpoint link is not downgraded, the method 500 proceeds to block 512 where it is determined whether there are any other endpoint devices that need checking. In an embodiment of block 512, the BIOS 204 may determine whether there are any other additional endpoint devices 216 coupled to the interfaces 212b-212d. If there is an endpoint device coupled to the remaining interfaces 212b-212d, then the method 500 may proceed to block 514 where the BIOS 204 advances to the next endpoint device, and the method 500 then returns to block 504. If, at block 512, the downgraded link detection process has been performed on all endpoint devices 216 coupled to the interfaces 212a-212d, then the method 500 may proceed to block 516 where the boot process advances. In an embodiment of block 514, the BIOS 204 may advance the boot process performed by the BIOS 204 to the next boot instruction. For example, the BIOS 204 may advance through the boot process until the BIOS 204 causes the OS 210 to load via the central processing system 206.

Thus, systems and methods have been described that provide for the detection of downgraded links provided by endpoint devices based on working link capability levels rather than maximum link capability levels, which allows a BIOS to more accurately report link downgrades of endpoint devices to a user of a computing device. The systems and method of the present disclosure may provide the working link capability levels in a VPD structure that is located in a memory device of the endpoint device, and from which the BIOS may access the working link capability levels. The BIOS compares the working link capability levels to corresponding actual link capability levels stored in a memory device of the endpoint device, and determines whether a downgraded link exists based on a comparison of the actual link capability levels to their corresponding working link capability levels. By comparing the actual link capability levels to the working link capability levels rather than to the maximum link capability levels (as is performed by a conventional BIOS), the systems and methods of the present disclosure do not report downgraded links for endpoint devices that are not operating at the maximum link capability levels, but are operating in a power savings mode where one or more of the actual link capability levels are less than the maximum link capability levels while still providing a resulting link that achieves a desired/predefined/optimal performance level for the link. Thus, the systems and methods of the present disclosure reduce or eliminate time needed to diagnose links that previously would have been reported as downgraded, enhance the user experience by notifying the user as to which endpoint devices provide an actual downgraded link, and report actual downgraded link issues that may affect the performance of the endpoint device to which that downgraded link is coupled.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A link downgrade detection system, comprising:
   a chassis;
   a chassis interface that is included on the chassis;
   an endpoint device that includes an endpoint interface that is coupled to the chassis interface, wherein the endpoint device is configured to provide an endpoint link that includes a first link capability at a maximum first link capability level and a second link capability at a maximum second link capability level, and wherein the endpoint device is configured to store a working first link capability level and a working second link capability level in a first memory device included on the endpoint device; and a Basic Input/Output System (BIOS) that is located in the chassis and that is coupled to the chassis interface, and wherein the BIOS is configured, during a boot process, to:
- enumerate the endpoint device;
- determine an actual first link capability level of the first link capability of the endpoint device;
- determine an actual second link capability level of the second link capability of the endpoint device;
- retrieve the working first link capability level and the working second link capability level from the first memory device;
- determine, based on the working first link capability level, the working second link capability level, the actual first link capability level, and the actual second link capability level, that the endpoint link is downgraded; and
- provide in response to determining that the endpoint link is downgraded, a notification that the endpoint link of the endpoint device is downgraded.

2. The system of claim 1, wherein at least one of the working first link capability level and the working second link capability level is less than the maximum first link capability level and the maximum second link capability level, respectively.

3. The system of claim 1, wherein the working first link capability level and the working second link capability level are included in a Vital Product Data (VPD) structure stored in the first memory device.

4. The system of claim 1, wherein the determining the endpoint link is downgraded includes determining that at least one of:
- the actual first link capability level is less than the working first link capability level; and
- the actual second link capability level is less than the working second link capability level.

5. The system of claim 1, wherein the maximum first link capability level and the maximum second link capability level are stored in a second memory device that is included on the endpoint device and that is separate from the first memory device, and wherein the actual first link capability level and the actual second link capability level are stored in a third memory device that is separate from the first memory device.

6. The system of claim 1, wherein the BIOS is further configured to:
- determine, based on the working first link capability level, the working second link capability level, the actual first link capability level and the actual second link capability level, that the endpoint link is not downgraded; and
- advance, in response to determining that the endpoint link is not downgraded, the boot operation.

7. The system of claim 6, wherein the determining that the endpoint link is not downgraded includes determining that both the actual first link capability level is at least the working first link capability level and the actual second link capability level is at least the working second link capability level.

8. An Information Handling System (IHS), comprising:
- an interface;
- a processing subsystem coupled to the interface; and
- a memory subsystem that is coupled to the processing subsystem and that includes instructions that, when executed by the processing subsystem, causes the processing subsystem to provide a Basic Input/Output System (BIOS) that is configured to:
  - enumerate an endpoint device that includes an endpoint interface that is coupled to the interface, wherein the endpoint device is configured to provide an endpoint link that includes a first link capability at a maximum first link capability level and a second link capability at a maximum second link capability level, and wherein the endpoint device is configured to store a working first link capability level and a working second link capability level in a first memory device included on the endpoint device;
  - determine an actual first link capability level of the first link capability of the endpoint device;
  - determine an actual second link capability level of the second link capability of the endpoint device;
  - retrieve the working first link capability level and the working second link capability level from the first memory device;
  - determine, based on the working first link capability level, the working second link capability level, the actual first link capability level, and the actual second link capability level, that the endpoint link is downgraded; and
  - provide in response to determining that the endpoint link is downgraded, a notification that the endpoint link of the endpoint device is downgraded.

9. The IHS of claim 8, wherein at least one of the working first link capability level and the working second link capability level is less than the maximum first link capability level and the maximum second link capability level, respectively.

10. The IHS of claim 8, wherein the working first link capability level and the working second link capability level are included in a Vital Product Data (VPD) structure stored in the first memory device.

11. The IHS of claim 8, wherein the determining the endpoint link is downgraded includes determining that at least one of:
- the actual first link capability level is less than the working first link capability level; and
- the actual second link capability level is less than the working second link capability level.

12. The IHS of claim 8, wherein the maximum first link capability level and the maximum second link capability level are stored in a second memory device that is included on the endpoint device and that is separate from the first memory device, and wherein the actual first link capability level and the actual second link capability level are stored in a third memory device that is separate from the first memory device.

13. The IHS of claim 8, wherein the BIOS is further configured to:
- determine, based on the working first link capability level, the working second link capability level, the actual first link capability level and the actual second link capability level, that the endpoint link is not downgraded; and
- advance, in response to determining that the endpoint link is not downgraded, a boot process.

14. The IHS of claim 13, wherein the determining that the endpoint link is not downgraded includes determining that both the actual first link capability level is at least the working first link capability level and the actual second link capability level is at least the working second link capability level.

15. A method for detecting a downgraded link, comprising:
- enumerating, by a Basic Input/Output System (BIOS), an endpoint device that includes an endpoint interface that is coupled to the BIOS, wherein the endpoint device is configured to provide an endpoint link that includes a first link capability at a maximum first link capability level and a second link capability at a maximum second link capability level, and wherein the endpoint device is configured to store a working first link capability level and a working second link capability level in a first memory device included on the endpoint device;
- determining, by the BIOS, an actual first link capability level of the first link capability of the endpoint device;
- determining, by the BIOS, an actual second link capability level of the second link capability of the endpoint device;
- retrieving, by the BIOS, the working first link capability level and the working second link capability level from the first memory device;
- determining, by the BIOS and based on the working first link capability level, the working second link capability level, the actual first link capability level, and the actual second link capability level, that the endpoint link is downgraded; and
- providing, by the BIOS and in response to determining that the endpoint link is downgraded, a notification that the endpoint link of the endpoint device is downgraded.

16. The method of claim 15, wherein at least one of the working first link capability level and the working second link capability level is less than the maximum first link capability level and the maximum second link capability level, respectively.

17. The method of claim 15, wherein the working first link capability level and the working second link capability level are included in a Vital Product Data (VPD) structure stored in the first memory device.

18. The method of claim 15, wherein the determining the endpoint link is downgraded includes determining that at least one of:
- the actual first link capability level is less than the working first link capability level; and
- the actual second link capability level is less than the working second link capability level.

19. The method of claim 15, wherein the maximum first link capability level and the maximum second link capability level are stored in a second memory device that is included on the endpoint device and that is separate from the first memory device, and wherein the actual first link capability level and the actual second link capability level are stored in a third memory device that is separate from the first memory device.

20. The method of claim 15, further comprising:
- determining, by the BIOS and based on the working first link capability level, the working second link capability level, the actual first link capability level and the actual second link capability level, that the endpoint link is not downgraded; and
- advancing, by the BIOS and in response to determining that the endpoint link is not downgraded, a boot process.

* * * * *